(12) United States Patent
Grice

(10) Patent No.: US 8,473,935 B2
(45) Date of Patent: Jun. 25, 2013

(54) JUST-AHEAD-OF-TIME COMPILATION

(75) Inventor: Matthew B. Grice, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1465 days.

(21) Appl. No.: 12/106,585

(22) Filed: Apr. 21, 2008

(65) Prior Publication Data

US 2009/0265696 A1 Oct. 22, 2009

(51) Int. Cl.
*G06F 9/45* (2006.01)

(52) U.S. Cl.
USPC ........... 717/151; 717/140; 717/148; 717/153; 717/156; 717/157; 717/159; 717/161; 717/154; 717/155

(58) Field of Classification Search
USPC ................. 717/136, 140, 155, 156, 157, 159, 717/161; 718/102, 104
See application file for complete search history.

(56) References Cited

U.S. PATENT DOCUMENTS

| | | | |
|---|---|---|---|
| 4,330,822 A * | 5/1982 | Dodson | 717/162 |
| 5,768,595 A | 6/1998 | Gillies | |
| 6,110,226 A | 8/2000 | Bothner | |
| 6,249,910 B1 * | 6/2001 | Ju et al. | 717/146 |
| 6,260,190 B1 | 7/2001 | Ju | |
| 6,907,601 B1 * | 6/2005 | Hoflehner et al. | 717/151 |
| 6,971,092 B1 * | 11/2005 | Chilimbi | 717/158 |
| 7,080,366 B2 | 7/2006 | Kramskoy et al. | |
| 7,213,240 B2 | 5/2007 | Wong et al | |
| 7,272,829 B1 | 9/2007 | Meirowitz | |
| 7,861,226 B1 * | 12/2010 | Episkopos et al. | 717/124 |
| 7,886,272 B1 * | 2/2011 | Episkopos et al. | 717/124 |
| 7,926,037 B2 * | 4/2011 | Leino et al. | 717/126 |
| 7,945,898 B1 * | 5/2011 | Episkopos et al. | 717/124 |
| 2002/0066089 A1 | 5/2002 | Clarke | |
| 2002/0095667 A1 * | 7/2002 | Archambault | 717/154 |
| 2003/0070161 A1 * | 4/2003 | Wong et al. | 717/148 |
| 2003/0236951 A1 | 12/2003 | Choi et al. | |
| 2004/0268323 A1 * | 12/2004 | Tanaka et al. | 717/136 |
| 2005/0229165 A1 * | 10/2005 | Ma et al. | 717/130 |
| 2006/0158354 A1 | 7/2006 | Aberg et al. | |
| 2007/0022411 A1 | 1/2007 | Tromey | |
| 2007/0130235 A1 * | 6/2007 | Rakoff et al. | 707/205 |
| 2007/0169012 A1 * | 7/2007 | Tan | 717/136 |
| 2007/0169019 A1 * | 7/2007 | Leino et al. | 717/136 |
| 2008/0028380 A1 * | 1/2008 | Guo et al. | 717/151 |
| 2008/0184210 A1 * | 7/2008 | Lee et al. | 717/136 |

OTHER PUBLICATIONS

Rountev, "Static control-flow analysis for reverse engineering of UML sequence diagrams", 2005, pp. 1-8.*
Rountev, A. et al., "Static Control-Flow Analysis for Reverse Engineering of UML Sequence Diagrams" In: The 6th ACM SIGPLAN-SIGSOFT Workshop on Program Analysis for Software Tools and Engineering (PASTE 2005), 2005, pp. 96-102.

(Continued)

*Primary Examiner* — Emerson Puente
*Assistant Examiner* — Charles Swift
(74) *Attorney, Agent, or Firm* — Workman Nydegger

(57) ABSTRACT

Pre-compiling postdominating functions. Some embodiments may be practiced in a computing environment including a runtime compilation. For example one method includes acts for compiling functions. The method includes determining that a function of an application has been called. A control flow graph is used to determine one or more postdominance relationships between the function and one or more other functions. The one or more other functions are assigned to be pre-compiled based on the postdominance relationship.

20 Claims, 2 Drawing Sheets

OTHER PUBLICATIONS

Proebsting, Todd A., et al., "Toba: Java for Applications a Way Ahead of Time (WAT) Compiler", 1997, 14 pages.

Hipeach, "Ahead of Time Analysis and Optimizations for Just in Time Compilation", 2006, 5 pages.

Wang, Ning, et al., "Enabling Efficient Program Analysis for Dynamic Optimization of a Family of Safe Mobile Code Formats", 2002, 10 pages.

Krintz, Chandra, et al., "Using Annotations to Reduce Dynamic Optimization Time", In Proceedings of the SIGPLAN Conference on Programming Language Design and Implementation (PLDI), Jun. 2001, 13 pages.

Hazelwood K., et al.: "Adaptive Online Context-Sensitive Inlining", First International Symposium on Code Generation and Optimization (CGO '03). San Francisco, California, Mar. 23-26, 2003, pp. 253-264.

Arnold M., et al.: "A Survey of Adaptive Optimization in Virtual Machines", Proceedings of the IEEE, New York, Feb. 1, 2005, pp. 449-466.

* cited by examiner

JUST-AHEAD-OF-TIME COMPILATION

BACKGROUND

Background and Relevant Art

Computers and computing systems have affected nearly every aspect of modern living. Computers are generally involved in work, recreation, healthcare, transportation, entertainment, household management, etc.

To execute on a computer, computer applications are typically compiled from a high level descriptive code to low level machine understandable code. This can be accomplished in a number of different ways depending on the computer language used in the environment in which the computer program is executed. For example, often computer programs are written by the programmer, and compiled into machine code readable at a low level by a processor in the processors native instruction set and provided to a consumer in the low level machine readable code.

Alternatively, languages may be used by programmers to develop programs that are provided to a consumer in a higher level language that is not compiled to low level natively readable machine language before being provided to a consumer. Using these languages, compiling may occur when an application is executed. In some environments, compiling occurs using just in time compilation. Just in time compiling compiles functions right before the functions are run when it is assured that the function will run. Thus, processing resources are conserved by not compiling functions that will not run and not compiling functions until right before they will run. However, the tradeoff to this is that startup time may be increased as compiling must occur to execute a particular function.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments described herein are directed to pre-compiling postdominating functions. Some embodiments may be practiced in a computing environment including a runtime compilation. For example one method includes acts for compiling functions. The method includes determining that a function of an application has been called. A control flow graph is used to determine one or more postdominance relationships between the function and one or more other functions. The one or more other functions are assigned to be pre-compiled based on the postdominance relationship. The control flow graph may be obtained in a number of different ways, including inclusion with metadata for the application, such as by annotations included in the application or separate metadata. Alternatively, the control flow graph may be generated as a part of the process of compiling a function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein allow postdominance relationship to be determined in just in time compilation type environments so as to determine that a function will be called in the execution of an application program such that the function can be pre-compiled so as to reduce startup times when executing functions. Some embodiments may be practiced in just in time compilation environments, such as java and .net®, Postdominance relationships relate the execution of functions. Illustratively, if a function postdominates another second function, then if the second function is executed, then the function is guaranteed to execute at some future time.

Postdominance relationships can be determined by reference to a directed control flow graph illustrating relationships between entries of functions. A postdominance graph can be constructed to document a postdominating relationship. Control flow graphs can be constructed for an application as a whole, or portions of an application. Control flow graphs can be constructed for individual functions of an application. Control flow graphs may be constructed at compile time of a function.

At compile time a function may be decomposed into its basic blocks. A basic block of code has a single entry point and a single exit point. Thus, to construct a control flow graph, code may be scanned to identify entry and exit points. Entry points are identified because they accept control from another point, while exit points transfer control to another point.

Figure 1:
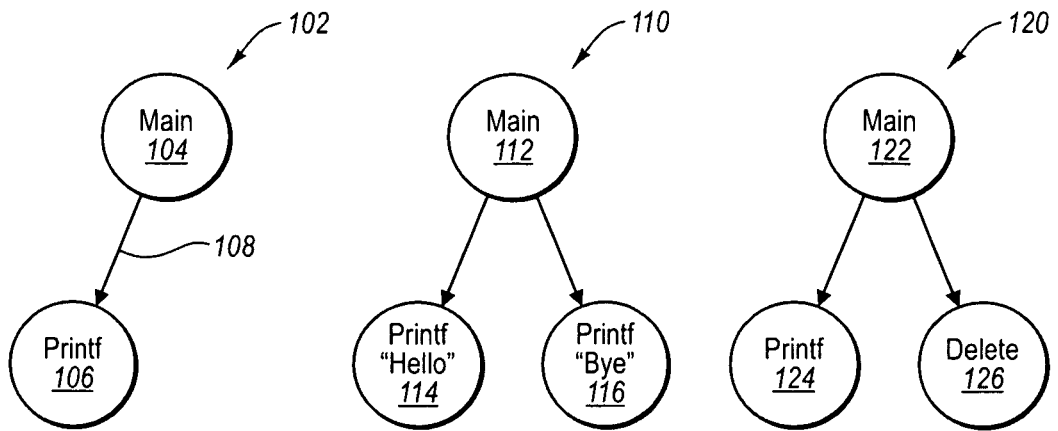
FIG. 1 illustrates a number of control flow graph and post-dominance graph examples.

FIG. 1 illustrates a postdominance graph 102. The graph 102 represents two functions including main and printf. The graph 102 is illustrated with two nodes, the main node 104 and the printf node 106. The two nodes are connected by an edge 108. Edges, such as edge 108 represent function calls. In the example illustrated, if the function main 104 is ever executed, then a call 108 will be made to the function printf 106. Thus the function printf 106 postdominates the function main 104.

While traditionally postdominance describes relationships between nodes in a directed graph, as used herein, postdominance may include relationships between entry points of nodes. For example, FIG. 1 also illustrates a directed graph 110. The directed graph 110 is a control flow graph that includes an entry block 112 for a function main, an entry block 114 for a printf function with a first argument (i.e. "Hello"), and an entry block 116 for the printf function with a second different argument (i.e. "Bye"). This directed graph 110 may be generated from code such as the following pseudo code: "If x then printf "Hello" else printf "Bye"". In the example illustrated, the function printf will execute if the function 112 executes by virtue of control flow entering at the entry 114 or 116. The nodes 114 and 116 are different invocations of the same function (with different arguments). However, the entry block 114 and entry block 116 both invoke the same printf function. As used herein, unless indicated otherwise, this is nonetheless a postdominant relationship. As such, the entry of printf postdominates the entry block node 112 of the main function. This is true even though none of the invocations of printf individually postdominates main 112. Thus, the post dominance graph 102 is a valid post dominance graph for the control flow graph 110.

Illustrating a contrary example, FIG. 1 further illustrates a control flow directed graph 120. The directed graph 120 includes an entry block node 122 for a function main, an entry block node 124 for a function printf, and an entry block node 126 for a function delete. This example illustrates that neither the entry block 124 of the printf function, nor the entry block 126 for the delete function postdominates the entry block 122 for the main function. In particular, if the main function is executed, the only guarantee is that control will flow either the entry of the printf function or the entry of the delete function. However, because the printf function and the delete function are different functions, there is no postdominance relationship between the main function and the printf and delete functions.

As noted above, postdominance is determined based on examination of a graph, such as the graphs 110 and 120 illustrated in FIG. 1. A postdominant relationship can be documented in a postdominance graph, such as graph 102. A graph may be obtained for examination in a number of different ways. For example, in one embodiment the graph may be constructed as a result of compiling a function. For example, when a function is compiled, the function is decomposed into basic blocks.

When a postdominancerelationship has been established, functions that postdominate an executed function can be assigned to the resources to be compiled. Notably the functions may be of a nature such that they would not execute for quite some time, however based on the postdominant relationship they will nonetheless at some time be called to execute. Thus, rather than compiling just in time, functions can be compiled ahead of time when it is nonetheless known based on the postdominant relationship that they will be called to execute.

Figure 2:
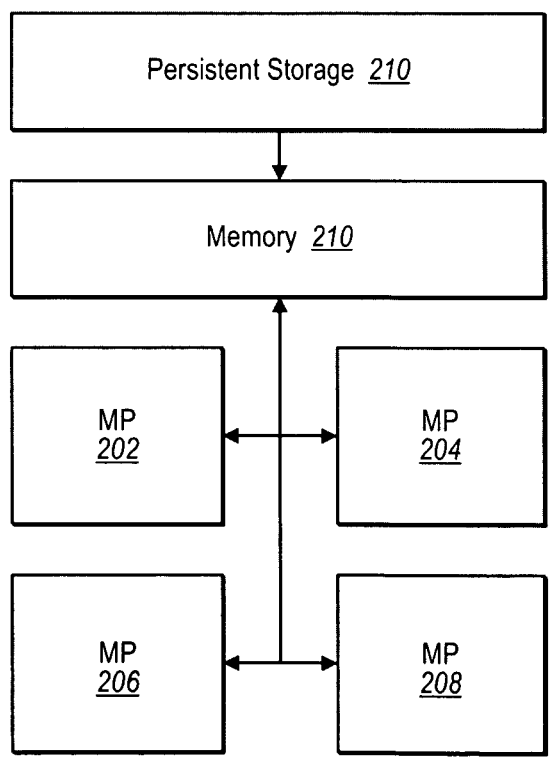
FIG. 2 illustrates a multi-core computing system.

Referring now to FIG. 2, an example embodiment where some features described herein may be useful is illustrated. FIG. 2 illustrates a multicore system 200. The multicore system 200 includes a plurality of processors including processor 202, processor 204, processor 206, and processor 208.

The processors 202, 204, 206, and 208 are connected to a memory 210. The memory 210 typically includes computer executable instructions which may be executed on one or more of the processors 202, 204, 206, and 208. Additionally, the memory 210 may include among the computer executable instructions, computer executable instructions that are in a high level programming language where those instructions are intended to be compiled prior to being executed on a processor.

Illustrating now one example embodiment, the memory 210 may load from the persistent storage 212 all or portions of a computer program application that is to be executed. The computer program application may include high level machine instructions that are to be compiled prior to being executed by a processor. A function from the computer program application may be selected to execute. This function may be compiled using one of the processors such as processor 202. During the compilation process a control-flow graph may be constructed or referenced as will be explained in more detail below. Reference to the control flow graph can be used to determine postdominance relationships between the function being executed on the processor 202 and other functions in the computer program application.

Embodiments may determine that a post-dominance relationship exists between an executing function and another function in a computer program application. Functions that post-dominate an executing function can be assigned to appropriate resources such that the post-dominating functions can then be compiled for future execution. In one embodiment, this includes assigning the post-dominating functions to a different processor in a multi-processor system than the processor on which the original function is being executed. For example, in the example illustrated above, if the original function is being executed on processor 202, compilation tasks for the postdominating function may be assigned to one of processors 204, 206, or 208.

Embodiments may also be implemented using virtual resources. For example, a system may include functionality for assigning multiple threads on a single processor as an implementation of multiple virtual processors on the single processor. Thus, in one embodiment, while a function is being executed on a virtual processor, postdominating functions of the function can be scheduled on a different virtual processor for pre compilation.

In an alternative embodiment, a queued solution may be implemented. In particular, in one example embodiment including a single processor, when a function is executed on the processor, a determination can be made that other functions can post-dominate the function. However, as the original function is executing on the processor, it may be desirable not to stop execution of the function to pre-compile the post-dominating functions. Thus, instead the post-dominating functions may be queued for subsequent compilation when the processor and other appropriate resources are free to perform the pre-execution compilation.

Some embodiments may be implemented where code for an application includes annotations, where the annotations include a control flow graph or a postdominance graph. In these embodiments, when a function is called or compiled, the annotations can be used to determine other functions that postdominate the function being called. These postdominating functions can then be pre-compiled by using idle resources in a computing system such as for example using the idle resources of multiple actual or virtual processors as described previously.

Some embodiments may further implement probabilistic pre-compilation. For example, using statistical analysis, it can be determined what the probability of a second function being called is when a first function is called. If the probability is high enough, e.g. within a pre-specified threshold, then the second function can be pre-compiled using idle resources in the computing system as described above for the post-dominating examples. The statistical analysis may occur in a number of different ways. For example, a computing system can monitor function calls to determine patterns that occur. Alternatively, an application developer can provide information regarding the probability of the second function being called if the first function is called. This may be provided, for example, as annotation to the application code, or as separate metadata that can be provided for the code. In one embodiment, annotations may include one or more postdominance graphs.

The following discussion now refers to a number of methods and method acts that may be performed. It should be noted, that although the method acts may be discussed in a certain order, no particular ordering is necessarily required unless specifically stated, or required because an act is dependent on another act being completed prior to the act being performed.

Figure 3:
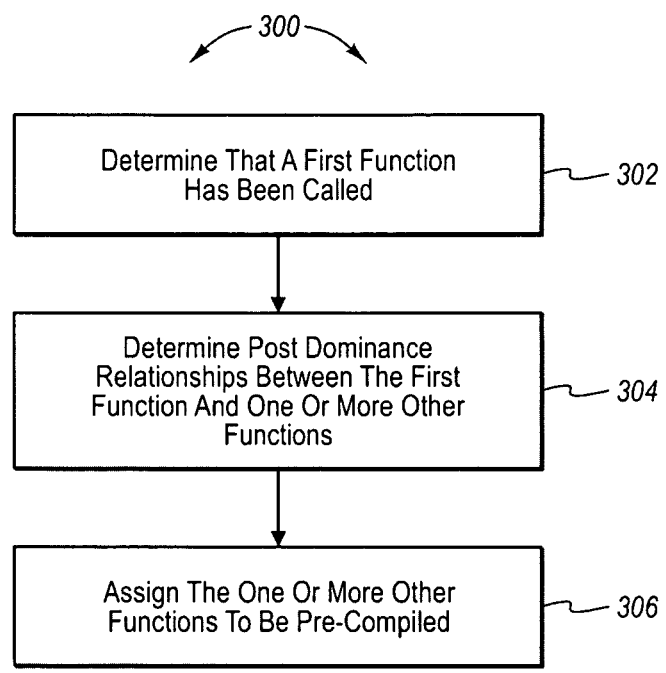
FIG. 3 illustrates a method of pre-compiling application code.

Referring now to FIG. 3 a method 300 is illustrated. The method 300 may be practiced in a computing environment including a runtime compilation. The method 300 includes acts for compiling functions, including pre-compiling some functions. The method includes determining that a function of an application has been called (act 302). For example, the method 300 may determine that a function, such as the function main with the entry block 112 illustrated in FIG. 1 has been called.

The method 300 further includes using a control flow graph, determining one or more postdominance relationships between the function and one or more other functions (act 304). For example, FIG. 1 illustrates that a printf function with entry blocks 114 and 116 postdominates the main function with the entry block 112. Notably, postdominance relationships may also exist where a single entry to a function postdominates the entry to another function.

The method 300 further includes assigning the one or more other functions to be pre-compiled based on the postdominance relationship (act 306). Details of some embodiments of assigning the one or more other functions to be pre compiled based on the postdominance relationship will be discussed in more detail below.

The method 300 may be practiced such that the method 300 further includes additional acts. For example, in one embodiment as a result of determining that the function has been called, a compiler is started. The compiler is configured to read in the function. At the compiler the function is decomposed into basic blocks. The control flow graph is constructed from the basic blocks, such that the control flow graph represents the basic blocks in the control flow graph.

In an alternative embodiment, the control-flow graph may be included in metadata. As such, the method 300 may include analyzing metadata associated with the application program. As noted, the metadata includes the control flow graph including one or more functions of the application program. In one embodiment, the metadata may include annotations to the application program. In an alternative embodiment, the metadata includes data external to the application program that can be provided to systems running the application program.

The following now discusses a number of examples of how assignment of the one or more other functions to be pre-compiled based on the postdominance relationship can be accomplished. In one embodiment, the method 300 may further be practiced in a computing environment including a multi core system. In this embodiment, assigning the one or more other functions may include assigning the one or more other functions to a different processor than a processor compiling the function. For example, FIG. 2 illustrates the system including multiple processors. While the processor 202 maybe compiling the function, one of the other processors 204, 206 or 208 may be assigned to process one or more of the other postdominating functions.

In an alternative embodiment, assigning the one or more other functions comprise assigning the one or more other functions to a different virtual processor than a virtual processor compiling the function In yet another alternative embodiment, assigning the one or more other functions comprise assigning the one or more other functions to a queue such that the one or more other functions can be compiled using resources that are determined to be idle.

As noted previously, determining one or more postdominance relationships between the function and one or more other functions may include determining post-dominance based on the collective set of invocations of any function as opposed to any one invocation of that function. For example, FIG. 1 illustrates a control-flow graph 110 which includes two invocations illustrated by entry nodes 114 and 116 of the same printf function. Thus the entry of the function printf postdominates the main function with the entry 112.

As noted previously, embodiments may be practiced where probabilistic analysis of functions is performed. For example, the method 300 may further include determining through probabilistic analysis that one or more additional functions are likely to be called based on analysis of at least one of the functions that have already been called or functions that postdominate functions that have already been called. The one or more additional functions are assigned to be pre-compiled by idle resources based on postdominance relationships and/or other criteria in addition to or instead of the postdominance relationship. For example, the one or more additional functions may be assigned to be compiled by idle processors in a multicore system, by idle virtual processors, or assigned to a queue system such that when the system resources are available the one or more additional functions may be pre-compiled.

In one embodiment, determining through probabilistic analysis that one or more additional functions are likely to be called includes referencing metadata for the application. For example, the metadata may part of external data that can be supplied to a system executing the application program. In an alternative embodiment, metadata may include annotations to the application.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a runtime compilation, a method of compiling functions, the method comprising:
   determining that a function of an application has been called;
   using a control flow graph, determining one or more postdominance relationships between the called function and one or more other functions in that the one or more other functions post dominate the function of the application; and
   assigning the one or more other functions to be pre-compiled based on the one or more other functions post dominating the called function of the application.

2. The method of claim 1, further comprising:
   as a result of determining that the function has been called, starting a compiler, wherein the compiler is configured to read in the function;
   at the compiler decomposing the function into basic blocks, and
   constructing the control flow graph, the control flow graph representing the basic blocks in the control flow graph and edges representing transfer of control between basic blocks.

3. The method of claim 1, further comprising analyzing metadata associated with the application program, the metadata comprising the control flow graph or postdominator graph including one or more functions of the application program.

4. The method of claim 3, wherein the metadata comprises annotations to the application program.

5. The method of claim 3, wherein the metadata comprises data external to the application program.

6. The method of claim 1, wherein the computing environment comprises a multi core system, and wherein assigning the one or more other functions comprise assigning the one or more other functions to a different processor than a processor compiling the function.

7. The method of claim 1, wherein assigning the one or more other functions comprise assigning the one or more other functions to a different virtual processor than a virtual processor compiling the function.

8. The method of claim 1, wherein assigning the one or more other functions comprise assigning the one or more other functions to a queue such that the one or more other functions can be compiled using resources that are determined to be idle.

9. The method of claim 1, wherein determining one or more postdominance relationships between the function and one or more other functions comprises determining post-dominance based on the entry to a plurality of different invocations of a function, each invocation having different arguments.

10. The method of claim 1, further comprising:
    determining through probabilistic analysis that one or more additional functions are likely to be called based on analysis of at least one of functions that have already been called or functions that post-dominate functions that have already been called; and
    assigning the one or more additional functions to be pre-compiled by idle resources based on the postdominance relationship.

11. The method of claim 10, wherein determining through probabilistic analysis that one or more additional functions are likely to be called based on analysis of at least one of functions that have already been called or functions that post-dominate functions that have already been called comprises referencing metadata for the application.

12. The method of claim 10, wherein determining through probabilistic analysis that one or more additional functions are likely to be called based on analysis of at least one of functions that have already been called or functions that post-dominate functions that have already been called comprises referencing annotations to the application.

13. The method of claim 10, wherein determining through probabilistic analysis that one or more additional functions are likely to be called based on analysis of at least one of functions that have already been called or functions that post-dominate functions that have already been called comprises determining that a probability exists within a pre-specified threshold.

14. In a computing environment comprising a runtime compilation, a method of compiling functions, the method comprising:
    determining that a function of an application has been called;
    analyzing annotations to the application program, the annotations comprising a postdominance graph including one or more functions of the application program;
    using the postdominance graph, identifying one or more postdominance relationships between the called function and the entry of one or more other functions in that the one or more other functions post dominate the function;
    assigning the one or more other functions to be pre-compiled based on the one or more functions post dominating the called function.

15. The method of claim 14, wherein the computing environment comprises a multi core system, and wherein assigning the one or more other functions comprise assigning the one or more other functions to a different processor than a processor compiling the function.

16. The method of claim 14, wherein assigning the one or more other functions comprise assigning the one or more other functions to a different virtual processor than a virtual processor compiling the function.

17. The method of claim 14, wherein assigning the one or more other functions comprise assigning the one or more other functions to a queue such that the one or more other functions can be compiled using resources that are determined to be idle.

18. In a computing environment, a system for compiling functions, the system comprising:
    one or more processors;
    one or more computer readable media coupled to the one or more processors, the one or more computer readable media comprising computer executable instructions that when executed by one or more processors are configured to cause the following to be performed:

determining that a function of an application has been called;

as a result of determining that the function has been called, starting a compiler, wherein the compiler is configured to read in the function;

at the compiler decomposing the function into basic blocks, constructing a control flow graph, the control flow graph representing the basic blocks in the control flow graph;

using the control flow graph, determining one or more postdominance relationships between the called function and the entry to one or more other functions in the one or more other functions post dominate the function of the application; and assigning the one or more other functions to be precompiled by at least one of a different processor or virtual processor than a processor compiling the function, based on the one or more other functions post dominating the called function.

19. The system of claim 18, wherein the computing environment comprises a multi core system, and wherein assigning the one or more other functions comprises assigning the one or more other functions to a different processor than a processor compiling the function.

20. The system of claim 18, wherein assigning the one or more other functions comprises assigning the one or more other functions to a different virtual processor than a virtual processor compiling the function.

\* \* \* \* \*